Feb. 26, 1935.   R. SAVY   1,992,447
MIXING MACHINE
Filed Aug. 7, 1933

ROBERT SAVY
INVENTOR

ATTORNEY

Patented Feb. 26, 1935

1,992,447

UNITED STATES PATENT OFFICE 1,992,447

MIXING MACHINE

Robert Savy, Courbevoie-Seine, France, assignor to Baker Perkins Company, Inc., Saginaw, Mich., a corporation of New York Application August 7, 1933, Serial No. 684,056
In France October 20, 1932

5 Claims. (Cl. 259—96)

This invention relates to mixers and pertains more particularly to that type of mixer used for mixing liquids and/or pulverulent and/or granulous substances.

The present invention consists of a device having preferably a plurality of axially spaced mixing elements rotating at differential speeds. By differential speeds is meant that one of the mixing elements may be positively driven in one direction, while the other element is positively driven in the opposite direction or both elements may be positively driven in the same direction at different speeds or one element may be positively driven and the other one driven through frictional contact with the shaft or other rotating parts of the positively driven mixing element.

The material is placed into the tank and the blades rotated so that one of the elements will draw the material axially onto the other element, which element projects the material either radially or tangentially toward the walls of the tank where the material then rises along the walls and is again drawn axially onto the other element during a given cycle.

Alternatively the element which draws the material axially toward the second mixing element may be provided with agitators on its outer surface which will divide the axially moving stream of material, causing part of it to be drawn axially onto the lower mixing element and part of the material to be forced radially or tangentially toward the side of the mixer where it will comingle with the material being projected from the lower mixing element.

It is therefore a prime object of my invention to provide a mixer in which the material is mixed by differentially rotated mixing elements.

It is a further object to provide a mixer in which the material is projected axially by one blade onto a rotating disc which projects the material either toward the walls of the tank or angularly upwards.

It is a still further object of my invention to provide a mixer which is more rapid in operation thereby producing a more homogeneous and intimate mixture of the materials.

With these and certain other objects in view, which will appear later in the specification, my invention comprises the devices described and claimed and the equivalents thereof.

Figure 1:
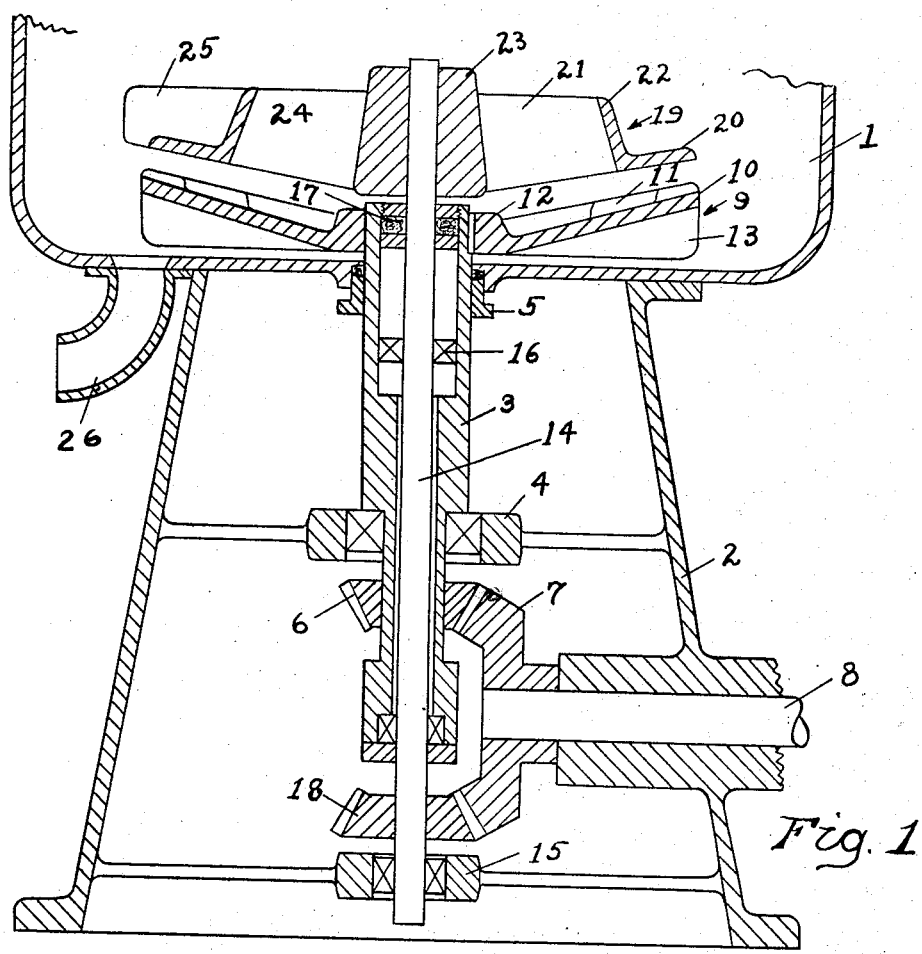

In the drawing, Figure 1 is a vertical sectional elevation of the machine illustratively embodying my invention.

Figure 2:
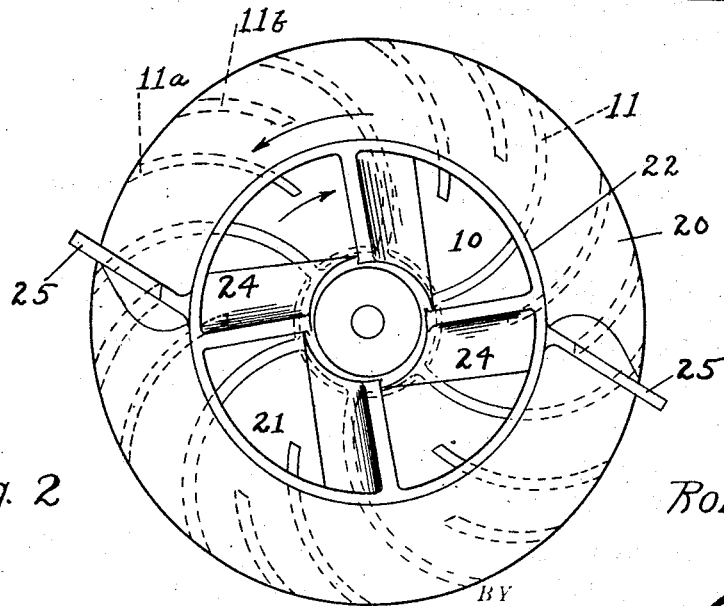

Figure 2 is a plan view of the mixing elements.

According to an illustrative embodiment of my invention as shown in the drawing the device comprises a mixing tank 1 supported on a base member 2.

Extending centrally through the base member 2 and tank 1 is a pair of shafts, one of which, as 3, is hollow and is supported by bearings 4 in the base member. The upper end of the shaft 3 extends through a suitable stuffing box 5 in the bottom of the tank 1. Near the lower end of shaft 3 is a bevel gear 6, meshing with a driving gear 7, secured to a drive shaft 8 to which power is applied.

Located just above the bottom of the tank 1, and secured to the upper end of the hollow shaft 3, is a mixing element 9 which consists of a conical disc 10, having its apex at the center of rotation. The upper face of the disc 10 carries a plurality of involute vanes or ribs 11, which extend from the periphery of the disc in a curvilinear direction toward the hub 12 of the disc. These vanes 10 are preferably of different lengths as shown in Figure 2 in which some of the vanes extend from the periphery of the disc to the hub 12. Others as 11a, extend from the periphery about midway to the hub, while others, as 11b, are still shorter. The arrangement of the ribs is such that during the revolution of the disc the material is broken up into small streams or jets and discharged toward the walls of the tank in a radial or tangential direction depending on the arrangement of the vanes 11.

To prevent stagnant pools beneath the lower mixing element 9 into which material may settle, I provide sweeping vanes 13 adapted to sweep along the bottom of the tank and throw any material which may collect there into the current of mixed material.

Extending centrally through the hollow shaft 3 is a solid shaft 14 supported by suitable bearings 15 in the base member 2 and also suitable bearings 16 arranged in the hollow shaft 3.

A suitable packing ring 17 surrounds the solid shaft 14, where it passes out of the top of hollow shaft 3 to prevent the material in the mixer from flowing through the hollow shaft. The lower end of the solid shaft 14 has a bevel gear 18 arranged to mesh with the driving gear 7, so that both shafts may be differentially driven.

To the upper part of the solid shaft 3 is keyed a second mixing element 19 axially spaced above the first or lower mixing element 9. The upper mixing element 19 consists of a disc 20 having a central opening 21 therein and an upwardly extending flange 22 adjacent the opening 21. Extending from the flange 22 across the central opening 21 to the hub 23 are impeller blades 24 so pitched that when the element 19 is rotated the material is drawn through the central opening 21 and projected forcibly onto the lower mixing element 9, where it is macerated and intimately mixed.

To further assist in the mixing action, it is sometimes preferable to provide a plurality of agitators 25 on the upper mixing element 19 which agitators extend from the central opening 21 toward the periphery of the disc 20. These agitators 25 divide the down-flowing stream of material and force part of it toward the walls of the tank where it mingles with the material thrown off by the lower mixing element.

The mixed material is discharged from the tank through a discharge opening 26 having a valve or stopper not shown.

By the above described means I have produced a mixing machine which is rapid in operation and which gives an efficient mixture to liquids and solids or various liquids or mixtures of solids, such as talc, powdered soapstone, flour and the like.

While I have shown and described a specific form of my invention it is understood that changes in parts or modifications of structure and mode of operation may be made without departing from the spirit of my invention as set forth in the appended claims.

Having thus described my invention, what I claim and desire to secure by Letters Patent is:—

1. A mixing machine comprising a tank, coaxially spaced mixing elements in said tank, the upper of said mixing elements consisting of a disc having a central opening therein, a flange on said disc adjacent said opening, blades extending from said flange across said opening to a central hub, said blades arranged to pull material downward through said central opening onto the lower of said mixing elements, agitators on the face of said disc extending outwardly toward the periphery of said disc, said lower mixing element comprising an inverted conical disc having its apex at the axis of rotation, vanes on both surfaces of said lower disc, the upper vanes being curved from the periphery of the disc inwardly toward the center, certain of said upper vanes being of different lengths, and means to rotate said mixing elements in opposite directions.

2. A mixing machine comprising a tank, coaxially spaced mixing elements in said tank, the upper of said mixing elements consisting of a disc having a central opening therein, a flange on said disc adjacent said opening, blades extending from said flange across said opening to a central hub, said blades arranged to pull material downward through said central opening onto the lower of said mixing elements, said lower mixing element comprising an inverted conical disc having its apex at the axis of rotation, vanes on both surfaces of said disc, the upper vanes being curved from the periphery of the disc inwardly toward the center, certain of said upper vanes being of different lengths and means to rotate said mixing elements in opposite directions.

3. A mixing machine comprising a tank, coaxially spaced mixing elements in said tank, one of said mixing elements consisting of a disc having a central opening therein, a flange on said disc adjacent said opening, blades extending from said flange across said opening to a central hub, said blades arranged to direct the material through said central opening and onto the other of said mixing elements, said other mixing element comprising a conical disc having its apex at the axis of rotation, vanes on both surfaces of said disc, the vanes on the surface toward said first mentioned disc being curved from the periphery of the disc inwardly toward the center, certain of said vanes being of different lengths and means to differentially rotate said mixing elements.

4. A mixing machine comprising a tank, coaxially spaced mixing elements in said tank, one of said mixing elements consisting of a disc having a central opening therein, a flange on said disc adjacent said opening, blades extending from said flange across said opening to a central hub, said blades arranged to direct material through said central opening and onto the other of said mixing elements, said other mixing element comprising a conical disc having its apex at the axis of rotation, vanes on the surface of said disc, the said vanes being curved to direct the material delivered to said disc toward the wall of said tank, certain of said vanes being of different lengths, and means to differentially rotate said mixing elements.

5. A mixing machine comprising a tank, coaxially spaced mixing elements in said tank, one of said mixing elements consisting of a disc having a central opening therein, a bladed propeller extending across said opening to a central hub, said bladed propeller arranged to forcibly direct material axially through said central opening and onto the other of said mixing elements, said other mixing element comprising a conical disc having its apex at the axis of rotation and having vanes on the surface of said disc, the said vanes arranged to direct the material delivered to said disc toward the walls of said tank, certain of said vanes being of different lengths and means to differentially rotate said mixing elements.

ROBERT SAVY.